United States Patent
Johnson et al.

(10) Patent No.: US 8,650,795 B2
(45) Date of Patent: *Feb. 18, 2014

(54) COATING FOR A DECOY OR FISHING LURE EXHIBITING REALISTIC SPECTRAL REFLECTANCE

(76) Inventors: Aaron Henry Johnson, Winona, MN (US); Brian Tande, Grand Forks, ND (US); Todd Andrew Pringle, Reiles Acres, ND (US)

(*) Notice: Subject to any disclaimer, the term of this patent is extended or adjusted under 35 U.S.C. 154(b) by 0 days.

This patent is subject to a terminal disclaimer.

(21) Appl. No.: 13/169,002

(22) Filed: Jun. 26, 2011

(65) Prior Publication Data

US 2011/0253011 A1 Oct. 20, 2011

Related U.S. Application Data (63) Continuation of application No. 12/231,099, filed on Aug. 29, 2008, now Pat. No. 7,966,764, which is a continuation-in-part of application No. 11/711,409, filed on Feb. 27, 2007, now abandoned, and a continuation-in-part of application No. 11/711,410, filed on Feb. 27, 2007, now abandoned.

(60) Provisional application No. 60/777,256, filed on Feb. 27, 2006.

(51) Int. Cl.
*A01M 31/06* (2006.01)
*A01K 75/02* (2006.01)
*G06F 17/10* (2006.01)
*G06F 7/60* (2006.01)

(52) U.S. Cl.
USPC ......... 43/2; 43/3; 43/17.5; 43/17.6; 43/42.32; 43/42.33; 252/582; 252/586; 703/2

(58) Field of Classification Search
USPC .......... 2/2.15, 2.16, 21.17, 900; 43/2, 3, 17.5, 43/17.6, 42.32, 42.33, 42.34; 106/287.35; 255/588, 582; 405/185, 186; 428/919; 441/64, 102–106; 703/2
See application file for complete search history.

(56) References Cited

U.S. PATENT DOCUMENTS 7,966,764 B2 * 6/2011 Johnson et al. ............. 43/3
2006/0035544 A1 * 2/2006 Halliday ................. 441/80
2006/0117637 A1 * 6/2006 Jeckle .................... 43/3

FOREIGN PATENT DOCUMENTS

JP 2002-238403 * 8/2002 ............. A01K 85/00

* cited by examiner

*Primary Examiner* — Bijan Ahvazi
(74) *Attorney, Agent, or Firm* — Jonathan Tolstedt (57) ABSTRACT

A coating for an animal decoy or fishing lure with a surface reflection which closely matches the spectral reflectance pattern of the animal that it is designed to mimic, including both human-visible and ultraviolet wavelengths, with the intent of making the decoy or fishing lure appear more realistic to animals that can see in both the human-visible and ultraviolet spectrums.

8 Claims, 6 Drawing Sheets

COATING FOR A DECOY OR FISHING LURE EXHIBITING REALISTIC SPECTRAL REFLECTANCE

CROSS-REFERENCE TO RELATED PATENT APPLICATIONS

The present application is a continuation of application Ser. No. 12/231,099, filed on Aug. 29, 2008, now U.S. Pat. No. 7,966,764, which is a continuation-in-part of U.S. application Ser. No. 11/711,409, entitled "Decoy exhibiting realistic spectral reflectance", filed on Feb. 27, 2007, now abandoned and which is also a continuation-in-part of U.S. application Ser. No. 11/711,410, entitled "Method for creating a decoy exhibiting realistic spectral reflectance", filed on Feb. 27, 2007, now abandoned both of which claim priority to U.S. Provisional Patent Application No. 60/777,256, entitled, "Spectrally matched devices and coatings," and filed on Feb. 27, 2006.

FIELD OF INVENTION

This invention relates to decoys and other replicates of animals used for hunting, for attraction of animals, as lures for the specific purpose of catching fish, or for other purposes. In particular, this invention involves a decoy or fishing lure having a surface reflectance that is matched to the light reflection of the animal it is intended to mimic, including ultraviolet wavelengths.

BACKGROUND OF THE INVENTION

Decoys are commonly used for the hunting and fishing of animals such as game fish, waterfowl, turkeys, doves, deer, antelope and many other animals. The purpose of a decoy is to mimic the appearance of an animal in order to attract animals, or for the purpose of deceiving animals to elicit a desired behavior. Artificial lures designed to mimic the general or specific form, coloration, patterning, sound or movement of bait fish and other animal prey of game fish are considered "decoy lures" for this application. These decoy lures are sometimes referred to as plugs, hardbaits, crankbaits, minnow lures, shad lures, stickbaits, jerkbaits, soft plastics, flies, and various hybrids and other forms of artificial lures. Other fishing lures exist that do not meet the definition of decoys or decoy lures, but instead are unnaturally shaped, patterned, or colored artificial lures designed to be highly visible and to illicit a predation response from game fish. These non-decoy artificial lures often have unnatural forms such as spoons, spinner baits, some jigs and other artificial lures that bare little or no natural resemblance to a particular animal. Non-decoy artificial lures utilize a game fish's instinctive predation responses, while decoy-lures also utilize a game fish's conditioned experiences successfully eating real bait fish and other prey. The term "decoy lure" is not a common industry term and is used in this application to draw the distinction between two generalized approaches to designing fishing lures. While the design of the two described types of artificial lures have areas of overlap (such as both typically possess hooks, some unnatural forms possess realistic patterning or coloration, and some realistic forms possess unnatural coloration or patterning) the non-decoy lures typically have stimulating but unnatural flashing, spinning motions, bright colors or attachments while decoy-lures typically resemble an animal in either form, color, patterning, movement, sound, or combinations therein. Both types of lures (decoy and non-decoy so defined) are commonly employed and it cannot be said that one type is superior to the other. Those skilled in the art of fishing know that each type of lure is suited for specific situations and species of game fish.

In the production of decoys and decoy lures, attention is given to making the decoy or decoy lure look like the intended animal in order to make the decoy or decoy lure more effective at attracting game animals or catching game fish. The color of a decoy is matched to the color of the animal using techniques common within the industry. Glare from some bird decoys is reduced using various surface treatment methods. Many products are designed so that motion is induced in the decoy. All of these techniques are employed in order to increase the "realism" of the decoy, as it is well understood that increased realism in decoys corresponds to higher performance (i.e., a decoy that better attracts the intended animal). Particular importance is often given to matching the coloration and patterning of the decoy lure to the bait fish or animal it is intended to mimic, such as minnows, shads, herring, smelt, suckers, young game fish, and other fish and animals such as frogs and crayfish. This appearance matching feature of decoy lures is referred to as "realism" in this application. In the design of lures, and to the specificity of the present invention, it should be noted the obvious fact that decoy lures possess some attribute(s) of the animal it is intended to mimic and non-decoy lures, by definition, are not tied to natural forms, coloration or patterning. It is to further the natural appearance or realism of the coloration, patterning or spectral reflectance of decoys or decoy lures, and therefore the effectiveness of decoys and decoy lures that the present invention is intended.

It remains a common misconception even today that most animals are color blind. For years it was believed that animals had vision systems that were more primitive than human's three primary color (trichromatic) vision. Modern research is showing that many primates are trichromatic and most non-mammal animals, including many fish, birds, and even some invertebrates, have vision systems and color perception far beyond humans and primates. It has also been confirmed that many animals limited to two primary colors (dichromatic), often are more perceptive of blue colors than humans and even see into ultraviolet (UV) wavelengths. Birds and many fish, for instance, are tetrachromatic; that is, they perceive colors based on a blend of four primary colors. Some animal species even possess five primary colors. These primary colors are determined by the animal's cones, which are special cells in the retina of the eye. Humans possess three types of cones, each having peak sensitivity at specific wavelengths: one at the wavelengths corresponding generally to blue light, one at the wavelengths corresponding generally to green light, and one at the wavelengths corresponding generally to red light—hence our blue, green, and red primary colors. All other colors perceived by humans are the result of these cones being stimulated simultaneously (e.g., simultaneous and generally similar stimulation of red and green cones causes a human to perceive "yellow"). Birds and many fish generally possess four types of cones, although this can vary from one species to another and also through genetic mutations. Other animals, some fish, and many mammals, possess only two types of cones, but these cones remain sensitive to ultraviolet wavelengths in animals whose ocular media does not block ultraviolet light.

These attribute of having more cone-types than humans and/or having the ability to see UV light means that the color and light perception of many animals is more precise and discriminating than human color perception, and many animals (even if they are limited to two types of cones) are capable of seeing color and light differences that are not apparent to humans.

Critical to creating realism in decoys and decoy lures is the understanding of vision and color perception in animals. Recent developments in the science of visual perception in animals has ramifications for decoy and lure manufacturers. The discovery that many fish and other game animals can perceive UV light has led some manufacturers in the hunting and fishing industries to develop decoys and lures and lure coatings in an attempt to exploit this discovery (most manufacturers of decoys and fishing lures, however, remain unaware of recent scientific developments or are unaware how these developments can be utilized).

Those manufacturers of decoys that have attempted to adapt their products to recent discoveries in animal color perception have not understood the science correctly and have not made the conceptual leap necessary to understand the fundamental differences in color perception between species. The best example, and one of the most applicable to the present invention, is the development of UV absorbing sprays for use on camouflage and decoys, and the marketing of UV absorbing paints, inks and coatings on decoys. Inventors and manufactures of these products have learned that birds and other game animals can see UV light and have concluded, incorrectly, that UV light is "man-made" and "bad" and must be eliminated from hunting products least the game animals see the decoys or camouflage for what they are. UV light has been described as having an "eerie glow" that frightens game animals away or a kind of invisible "glare" that must be covered up. A product called Fool-A-Bird™ originating from US patent application 20060117637 by Jeckle describes a temporary coating that absorbs UV light designed to be used for waterfowl decoys, camouflage, and hunting blinds. Also, a product called U-VKiller™ from Atsko, Inc. is marketed to hunters for the purpose of eliminating blue fluorescence from camouflage clothing and other hunting products. U-V-Killer™ is sometimes incorrectly interpreted as intended to eliminate UV reflection (perhaps because the UV-powered "glow" of fluorescence is often mistakenly believed to be UV reflection). The misinterpretation of products such as U-V-Killer™ and the marketing claims of products like Fool-A-Bird™ contribute to the incorrect belief in many parts of the hunting community that UV reflection is "bad" and should be eliminated.

Some fishing lures have been marketed with the purported ability to reflect or emit UV light to be more visible to the fish, especially at deeper depths. These fishing lures, however, do not teach whether UV should be absorbed or reflected, or whether it is "good" or "bad" on hunting products. It is well known that non-decoy fishing lures can sometimes be rendered more effective by making them more visible, more colorful, and even shinier—depending on the fishing circumstances. This art does not teach the natural UV reflection level and pattern of bait fish, only that generic UV reflection can make lures more visible to fish. This art also does not teach how to determine the natural UV reflection of bait fish, other game animals, or natural objects. The inventors have also determined that some of the fishing lures marketed as UV reflecting are actually fluorescent and not UV reflecting.

U.S. patent application 20060121166 by Jeckle describes a temporary coating that reflects UV light designed to be used on artificial lures and live baits. Jeckle teaches that the application of said temporary coating increases the visibility and attractiveness of the lure or bait. Similarly, fluorescent and phosphorescent colored lures and lure paints are designed to increase the visibility and attractiveness of lures and are commonly used in fishing lures (U.S. Pat. Nos. 3,935,659, 4,803,793, 4,823,502, 5,063,703, 5,490,344, 6,286,246, 6,748,693, 7,216,455, 7,260,913). Yutaka, et. al. in the abstract of JP2002238403 describes a lure coated with a UV reflecting coating to increase the conspicuousness of the lure. What Jeckle and Yutaka et. al. do not appear to recognize is that UV reflection has been a common property of many fishing lures since the introduction of polished metals or embossed metal foils as materials for lures, which dates back at least 80 years. Many metals are highly UV reflecting and shine in UV in a similar manner to their shine in the human-visible wavelengths. This shine is often angle-dependant and is referred to as specular reflectance, which is different from the non-angle-dependant diffuse reflectance of most coatings, paints, or molded-in colors.

Irrespective of Jeckle's or Yutaka et. al's awareness (or lack thereof) of UV reflection in metals, this and similar art, teach the use of light reflection or emission to increase the visibility and/or attractiveness of lures. For example, Causey in U.S. Pat. No. 4,936,042 teaches the use of a highly reflective metal strip that is intended to catch the attention of fish. Numerous other art discloses the use of surface reflectivity to attract game fish, including the use of dimples, sequins, laser etching and other surface modifications to alter the nature of the reflection. U.S. Pat. No. 4,862,631 teaches the use of small glass spheres in a fishing lure coating in order to increase its reflectiveness. Additional prior art employs the use of artificial sources of light, including light emitting diodes or incandescent light bulbs to make the lure more visible to fish (see, for example, U.S. Pat. No. 4,227,331 by Ursrey).

This art teaches the application of non-decoy artificial lure feature of conspicuousness and does not teach increasing realism of decoy lures. This art purports to teach that UV reflective coatings can make lures more visible to fish—even though many metallic lures are already highly UV reflective. Jeckle also teaches the application of UV reflective coatings to live bait fish though research by the inventors and others has shown that many fish, including many bait fish, already possess UV reflecting surfaces.

This art does not teach the reflective properties of animals mimicked by decoys or decoy lures in the full spectrum visible other animals, including ultraviolet light. This art also does not teach how to determine the natural UV reflection of bait fish, other game animals, or natural objects. To date, there is no art known to the inventors that teaches a decoy or decoy lure that possesses the natural UV reflective levels and patterning of the animal it is designed to mimic. What is needed is a decoy or decoy lure with the natural UV reflective level and patterning of the animal it is intended to mimic. Such a decoy or decoy lure would possess increased realism, and therefore greater effectiveness as a decoy or decoy lure. It is to this need and advantage that the present invention is intended.

It is well known by those skilled in the art of paint formulation that virtually all paint, with the exception of some deep colors, uses UV absorbing titanium dioxide as the primary lightening/whitening pigment and as such, is already inherently UV absorbing. The common form of Rutile titanium dioxide ($TiO_2$) is completely UV absorbing and the less common form of Anatase $TiO_2$ possesses only a trace of UV reflection in the wavelengths nearest human-visible light and as such, neither form of $TiO_2$ is suitable to produce UV reflective coatings. Because of this well known property of $TiO_2$, the inventors do not understand why Jeckle claims $TiO_2$ as a primary mineral pigment in his UV reflective coating.

While many man-made objects, especially conventional paints, absorb UV light, recent research has shown that many natural objects as well as animals can reflect UV light. This reflection and its patterning, while not visible to humans, can be seen through the use of ultraviolet photography and videography, in which UV light is converted to colors or monochrome images that can be perceived by humans.

A study by Eaton and Lanyon ("The ubiquity of avian ultraviolet plumage reflectance" published in the Proceedings of the Royal Society of London—Biological Sciences in 2003), measured the UV reflection of hundreds of bird feather patches of different colors using UV-Visible spectrophotometry. This study showed that some colors such as white typically exhibited some level of UV reflection but the amount of reflection varied significantly between species. This study, the most comprehensive attempt to date to classify the UV reflectance of birds, did not include the grays, tans, and other light earth tones typically found in many game birds, nor did it investigate the overall pattern of UV reflection for any bird. Other studies have shown that some species of birds have black feathers with significant UV reflection while other black feathers have virtually no UV reflection. Feathers that appear white to humans can possess UV reflection from low to moderate to high depending on the species of bird and the location of the feather on the bird. Often male/female pairs of bird species that appear to be identical to humans actually have differing UV reflectance characteristics, making the color difference between the sexes very obvious to birds.

Taken in its entirety, the present knowledge of UV reflectance in bird plumage, fish scales, fur, or other animal surface cannot be used successfully to predict the amount of UV reflection of an animal based on the human-visible color of the surfaces of the animal.

While is has been established that many game animals can see UV light—although many manufacturers are unaware of it, and those that are aware of it have taught away from the present invention—and it has been established that many animals and natural objects possess UV reflection, it has not been taught by any art, nor is it obvious, what the specific UV reflection of any or all surfaces (such as plumage, scales, skin or fur) of species of bait fish and game or prey animals mimicked by decoys or decoy lures is and how this knowledge, were it to be obtained, can be properly exploited to improve the performance of decoys and decoy lures.

Jeckle acknowledges this lack of knowledge within the art, stating in 20060117637 that "It is impractical, if not impossible to precisely duplicate the natural reflectance of UV light off the feathers of birds because the reflectance and color hues are in the UV range that humans cannot perceive. Without being able to perceive the reflectance, any attempt of realistically mimicking the reflection is guesswork." Jeckle concludes that "The solution to this problem is to diminish the reflectance of ultraviolet light while maintaining a presumptively natural appearance in the visible spectrum."

It is clear that the UV reflectance levels and patterning of game animals and natural objects such as foliage and a means to reproduce that reflectance on decoys and other hunting products is not known. Jeckel and others teach that because of this lack of knowledge, the only option is to eliminate UV reflection from hunting decoys and other objects viewed by birds and mammals. Jeckel in 20060121166 and others also teach that, presumable from this same lack of knowledge, the UV reflection is to be maximized on fishing lures.

Various materials are used to make decoys and decoys lures including wood, metals, plastics, polymer foams, woven and non-woven fabrics and combinations of these and other materials. Several methods can be used to impart surface characteristics including paint, molded-in colors and textures, textured foils, polished or stamped metals and other methods. To provide human-visible color for the intended species, several methods can be used. One method is to use the inherent color of the material, as is sometimes the case with fabrics and foams. Another method is to incorporate color pigments directly into the material using color compounding methods common in the plastics industry. The most common method is to apply a surface coating, typically an ink or paint that is formulated to have the desired human-visible color. Often, a combination of these methods is used.

For the production of decoy lures, a common method include the use of foils textured to look like scales to match the silvery surface of the sides of bait fish with painted dark tops and painted white or light colored bellies. This pattern (dark on top, silvery sided, and light on bottom/belly) is extremely common for many decoy lures and is often augmented with distinctive patterning such as stripes or vividly colored tops. This pattern (dark on top, silvery sided, and light on bottom/belly) is consistently seen on many bait fish as it is the bait fish's natural camouflage. Another common derivative of the decoy lure patterning is the use of printing methods to impart life-like features on the lure. Decoy lures are also commonly produced with plastics possessing translucent or iridescent properties to mimic the silvery translucence of some bait fish. While it has been pointed out by the inventors that many metals on lures are inherently UV reflective, this is not taught in the art as desirable for a decoy lure. More importantly, an extremely common feature of decoy lures is white or light colored (via painted, printed, or molded-in color) bellies. This light colored or white surface is intended to mimic the diffusely reflective light colored bellies of prey animals such as bait fish. Because metals reflect in a specular or angle-dependant manner, they do not easily mimic the highly diffuse or non-angle-dependant reflective properties of white, and as such, metals make poor materials to mimic the white or light colored bellies of bait fish. To properly mimic this diffusely reflective light underbelly, decoy lures typically use white or light colored paint, inks, or molded-in colored plastics. All of these material choices will use $TiO_2$ as the whitener and as such, will be UV absorbing. The inventors have determined (using methods established in U.S. patent application Ser. Nos. 11/711,409 and 11/711,410, to which this application is a continuation in part) that many bait fish bellies are highly diffusely UV reflective, and as such, current lures will not match the natural appearance of bait fish for game fish possessing UV sensitivity. Current science indicates that perhaps two-thirds of freshwater fish and one half of marine fish possess UV sensitivity. What is needed is a decoy lure that matches the spectral reflectance of the prey animal it is designed to mimic in the full visual spectrum, including ultraviolet, of the game fish the decoy lure is intended to catch. It is to this need that the present invention is intended.

A search of the prior art will show patents and other documents that discuss the use of materials that are sensitive to or resistant to UV light, but these prior art references do not teach the measurement and use of the reflection of UV light. Some references refer to "UV resistance", which involves the use of materials and coatings to prevent damage such as yellowing due to the effects of UV light. UV-resistant materials are typically UV absorbing and therefore can not be used to mimic the UV reflectance patterns of animals or objects. Other references discuss the use of UV inks on their products. UV inks are special inks which can be cured under the presence of high-intensity UV light, but they are not intended to reflect UV light and are typically not UV reflective. Other references describe the use of UV for phosphorescence and fluorescence, but this is not UV reflectance but rather UV energy used to "charge" the glow effects of phosphorescence and fluorescence.

Regardless of how artificial color is incorporated, it is formulated for the intended species or natural object based on human color perception, without accounting for the differences between human and animal color vision. Industrially, color matching is often done using the L-a-b scale, which assigns each color a point in the three dimensional space defined by three axes: L (lightness), a (magenta to green) and b (blue to yellow). This system is based on the peak sensitivity of the cones of the human eye and is therefore an inadequate method for matching colors as perceived by animals.

Ultraviolet-visible (UV-Vis) reflectance spectroscopy is an analytical method of measuring the reflection of light from a surface over a range of wavelengths. Instruments used for this measurement shine light at an object and measure the intensity of the reflected light. By changing the wavelength of the incident light, a graph of the intensity of reflected light versus wavelength can be developed. Using this method to assist the matching of colors is not dependant on the color vision of humans and therefore avoids the inadequacies of using human vision (and methods dependant or build around human vision such as traditional L-a-b methods) for matching colors for animal vision systems.

While many artificial or "man-made" objects are UV-absorbing, some materials, including some fabrics and polymer foams which are naturally white in color, reflect UV light. However, this UV reflection does not match that of any specific animal species and may be either more or less reflective at a particular wavelength. Other materials which appear white to humans are UV fluorescent, which means they absorb UV wavelengths and emit light at human-visible longer wavelengths. This is why some fabrics appear extra-bright under a UV emitting black light. This effect alters the color of the object in a way that can be perceived by some animals.

U.S. Pat. No. 4,691,464 by Rudolph describes a flexible fabric covering which can be placed over a decoy in an attempt to enhance the life-like accuracy of the decoy. Rudolph describes the use of reflective panels placed in strategic locations on the fabric covering in an attempt to match the iridescence of the brightly colored secondary feathers of a bird. Iridescence is created by manipulating the surface material such that the color of the surface appears to shift depending on the angle by which the surface is observed. Iridescence does not affect the UV characteristics of the decoy, and the use of a reflective panel on a decoy covering does not accurately mimic the reflective characteristics of a decoy as seen by an animal. Rudolph does not teach the use of UV reflective characteristics to mimic those of an animal.

The UV reflection properties of minerals have been measured and it is known, by those skilled in the art, which pigments and fillers may be used to achieve ultraviolet light reflection. Matching the UV reflectance of paint to snow has been utilized in military camouflage by Lindquist et. al. in U.S. Pat. No. 3,300,325 using barium sulphate, calcium carbonate and/or antimony trioxide.

To achieve maximized appearance realism, and therefore improved performance, what is needed is a decoy or decoy lure that is designed to match the coloration and/or patterning in the entire light reflectance spectrum of the vision system of the animal which it is intended to mimic. To develop decoys or decoy lures that match the UV reflection of the animal surface the decoy or decoy lure is mimicking requires filling the knowledge gap of the UV reflection signatures of those surfaces, and incorporating said reflection into the manufacture of the decoy or decoy lure. To determine those UV signatures requires refining a method to determine said signatures. When the UV signatures are known, the next step needed is to synthesize existing art in materials sciences (for example, paint color matching in the visible wavelengths) with what is known about the UV reflection of materials. This effort must be combined with the study of the UV reflection of candidate materials whose UV reflection is not known. This gained knowledge and newly developed methods must then be successfully applied to decoys or decoy lures.

SUMMARY OF INVENTION

In one aspect of the invention, the outer surface of an animal decoy is modified to match the actual reflectance of the animal in the wavelengths of light which are visible to the animal.

In another aspect of the invention, portions of the outer surface of an animal decoy are modified to possess bright UV reflectance where white areas exist on the corresponding areas of the animal, and moderate UV reflectance where gray or tan areas exist on the corresponding areas of the animal.

In another aspect of the invention, the reflective characteristics of an animal are measured using techniques such as UV imaging in order to create a map showing the areas of low, medium, and high ultraviolet reflectance on the outer surface of the animal.

In another aspect of the invention, the reflective characteristics of various portions of the outer surface of an animal are measured using techniques such as UV-Visible spectroscopy to create line graphs representing the percent reflectance for each wavelength of light in both the ultraviolet spectrum of sunlight (300 to 400 nm) and the human-visible (400 to 700 nm) spectrums.

In another aspect of the invention, the measured reflective characteristics of an animal are used to formulate coatings such as paints which match the UV-Visible line graphs for that animal, and which can be used to create a model or decoy of the animal.

In another aspect of the invention, the outer surface of an animal decoy is modified to match the actual reflectance of the animal in the wavelengths of light which are visible to the animal.

In still another aspect of the invention, portions of the outer surface of a decoy lure are modified to possess bright UV reflectance where white or light colored scales exist on a bait fish and moderate UV reflectance where silvery, light brown, tan, or other non-dark and non-white colored scales exist on a bait fish or surfaces exist on an animal.

These aspects and others are achieved by the present invention, which is described in detail in the following specification and accompanying drawings which form a part hereof.

DETAILED DESCRIPTION

It must be understood that, just as the human-visible colors present on an animal vary greatly over the surface of that animal, the ultraviolet (UV) light reflected from the surface of that animal can also vary greatly. A human-visible color such as the green found on the head of a drake mallard duck is simply a set of reflected wavelengths of light that falls within the spectrum of light visible to humans; specifically, it is wavelengths of light that humans perceive as the color green (for illustration purposes only we ignore the iridescent "angle-dependant" nature of these feathers). Depending on the exact wavelength and intensity of the reflected light, the color "green" may range in appearance from blue-green to yellow-green. Similarly, the amount of UV light, as well as the specific wavelengths of UV light, reflected from the surface of an animal can vary greatly, creating different "colors" of UV light. Although these UV colors are not visible to humans, they are visible to many animals, and should be accounted for when creating realistic models or decoys of those animals. That is the intent of the present invention.

Throughout this specification and in the claims, the terms "matches" or "substantially matches" and derivations thereof are used to describe to what degree the surface reflection patterns of the decoy and decoy lures created through the employment of this invention will appear natural to the animals for which they are intended to deceive. It is possible, for example, for someone to increase the total amount of ultraviolet light reflected from a decoy or decoy lure by covering it with an ultraviolet-reflecting material such as Tyvek for bird decoys or embossed foils for decoy lures. While there is an overall increase in the amount of ultraviolet light reflected from such a decoy, this decoy will not "substantially match" the varied surface refection pattern of a real animal or object, and will not appear realistic to the target animal. The terms "matches" and "substantially matches" and derivations thereof, as used in this specification, are used to describe decoys and decoy lures with surface reflectance patterns which will appear realistic to the target animal, and which fall within the range of ultraviolet wavelengths seen in nature for the corresponding portions of the actual target animal or object being mimicked.

Figure 1:
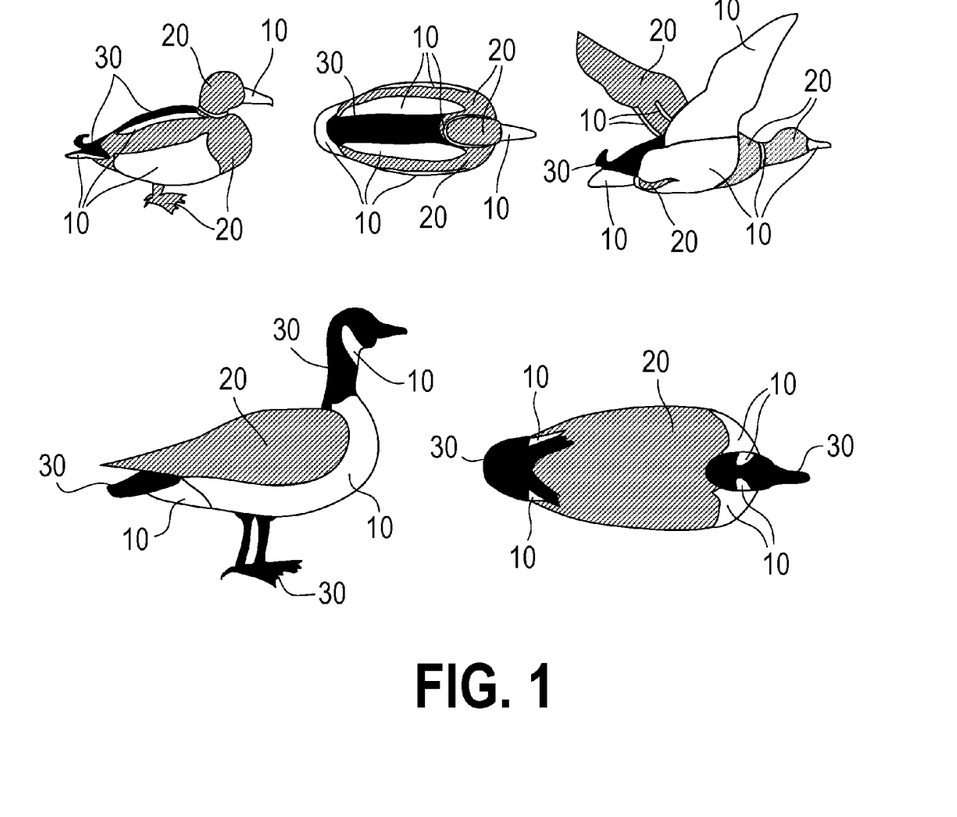
FIG. 1 shows the typical ultraviolet reflectivity patterns of two types of waterfowl.

FIG. 1 illustrates the UV reflectance patterns of two different waterfowl. Although waterfowl are used as examples herein, it should be understood that any type of animal can be used with similar results. FIG. 1 shows areas of high UV reflectance 10, areas of medium UV reflectance 20, and areas of little or no UV reflectance 30 in the patterns in which they would typically appear on a drake Mallard duck or a Canada goose. Although the present invention shows areas of high UV reflectance 10 are often seen associated with areas of white or light human-visible colors on the waterfowl, studies have shown that this is often not the case for all white colored animals. Similar studies have shown that areas of black can be associated with significant UV reflectance, and areas of white can have very little UV reflectance. White feathers and many other white surfaces on animals (for example some white fish scales) often possess UV reflection of 50 to 70% (a common range of waterfowl white feathers and some white fish scales) but could be as high as 90% and as low as 15%. These percentages represent averages of the reflectance across the UV wavelengths visible to the targeted animal. Similarly, non-white colors have ranges typical for each species. These percentages can be determined using UV-Visible reflectance curves. The UV-Visible reflectance curves of some common decoy and decoy lure colors are shown in FIG. 2.

Figure 2:
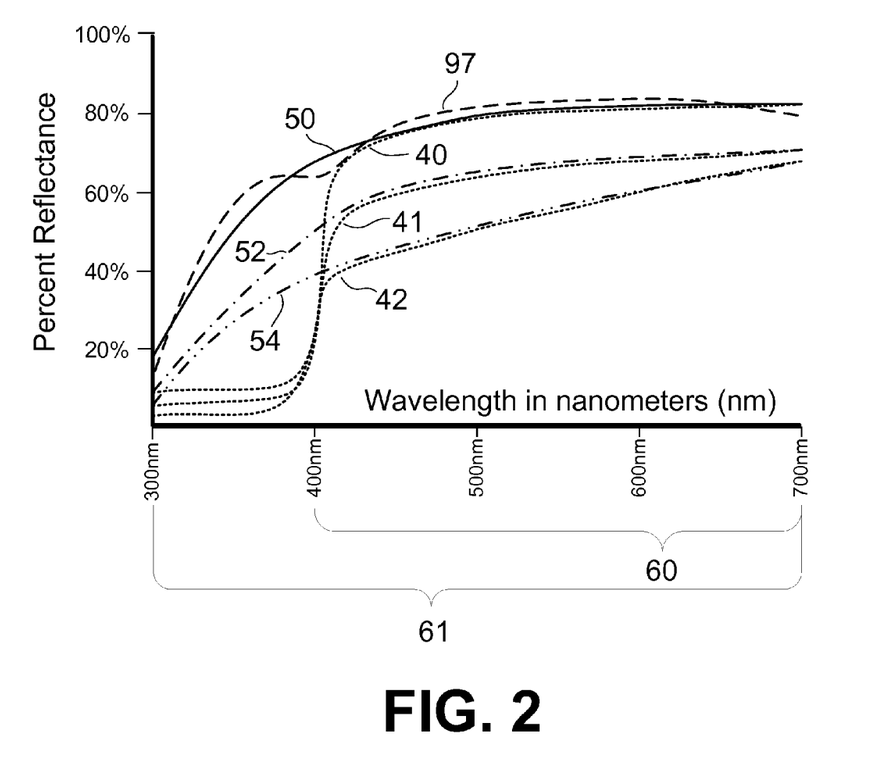
FIG. 2 shows the ultraviolet reflectance curves given by the various body parts of typical waterfowl and baitfish compared against the ultraviolet reflectance curves given by typical decoy and decoy lure coatings and materials found in the prior art.

FIG. 2 illustrates the UV-Visible reflectance curves of example animals as compared to materials found in the prior art used for coating decoys or decoy lures. The visual spectrum of humans 60 and the visual spectrum typical of birds, many fish and other animals 61 are indicated along the bottom access of the line graph. The reflectance curves of several materials taught in the prior art, including white 40, light tan 41, and tan 42, are shown. Each of the materials 40, 41, and 42 demonstrates very little reflectance in the wavelengths of ultraviolet light between 300 and 400 nanometers. The reflectance curves of a Snow goose body and wing 50, a Canada goose cheek patch 52, a Canada goose breast 54 and a typical white area on a bait fish such as a Minnow 97 are also shown. The reflective characteristics of animal components 50, 52, 54, and 97 cannot adequately be implemented using materials 40, 41, and 42. Animals which can see in the visual spectrum of birds and many fish 61 will see materials 40, 41, and 42 as significantly different colors than animal components 50, 52, 54, and 97 even though materials 40, 41, and 42 will appear as close matches in the human visible spectrum 60. The range of UV wavelengths within the visual spectrum of animals 61, can vary from species to species. This range could be as wide as 300 to 400 nm but is more commonly about 320 to 400 nm. This effective visible UV range can be about 350 to 400 nm for some species such as many waterfowl or as narrow as about 380 to 400 nm.

Figure 3:
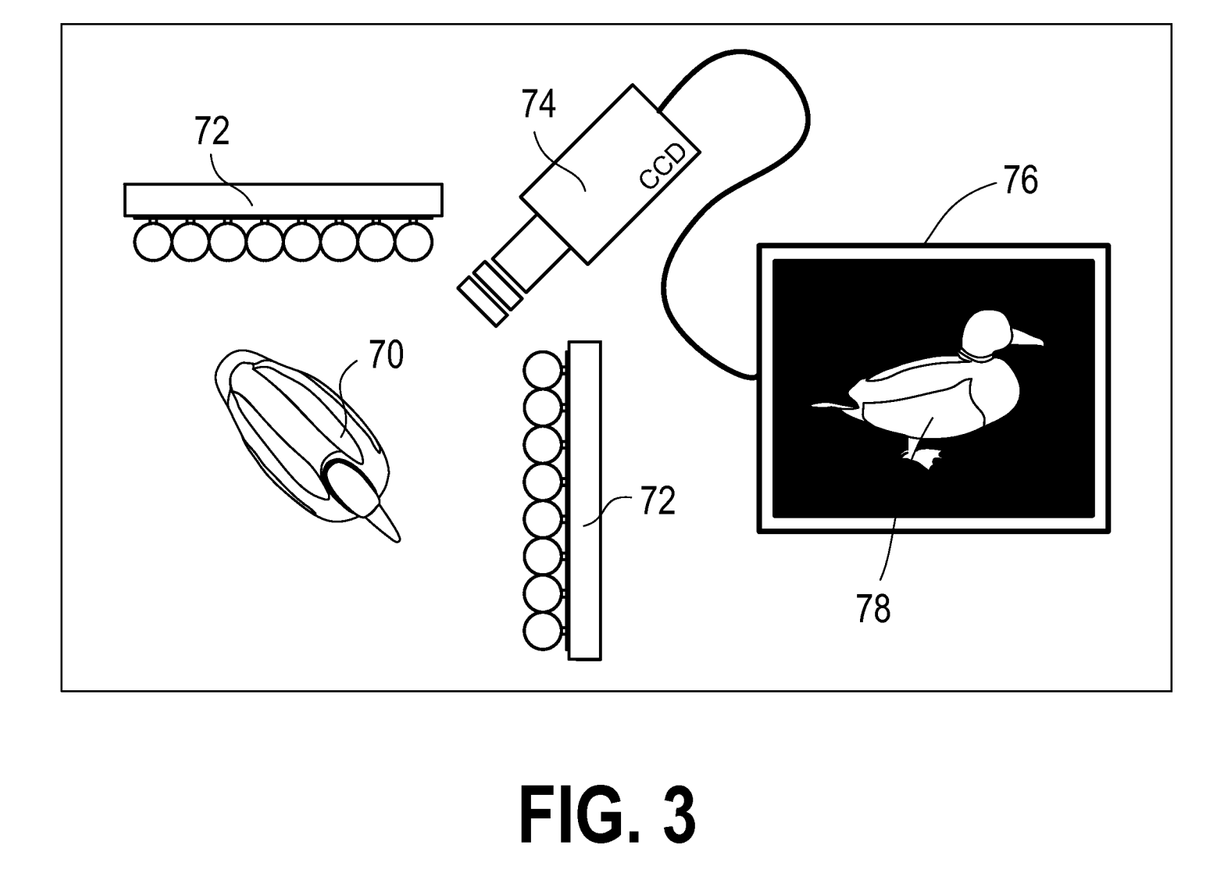
FIG. 3 illustrates an ultraviolet imaging system used to determine the patterns and relative intensity of the UV reflecting area of an animal.
Figure 4:
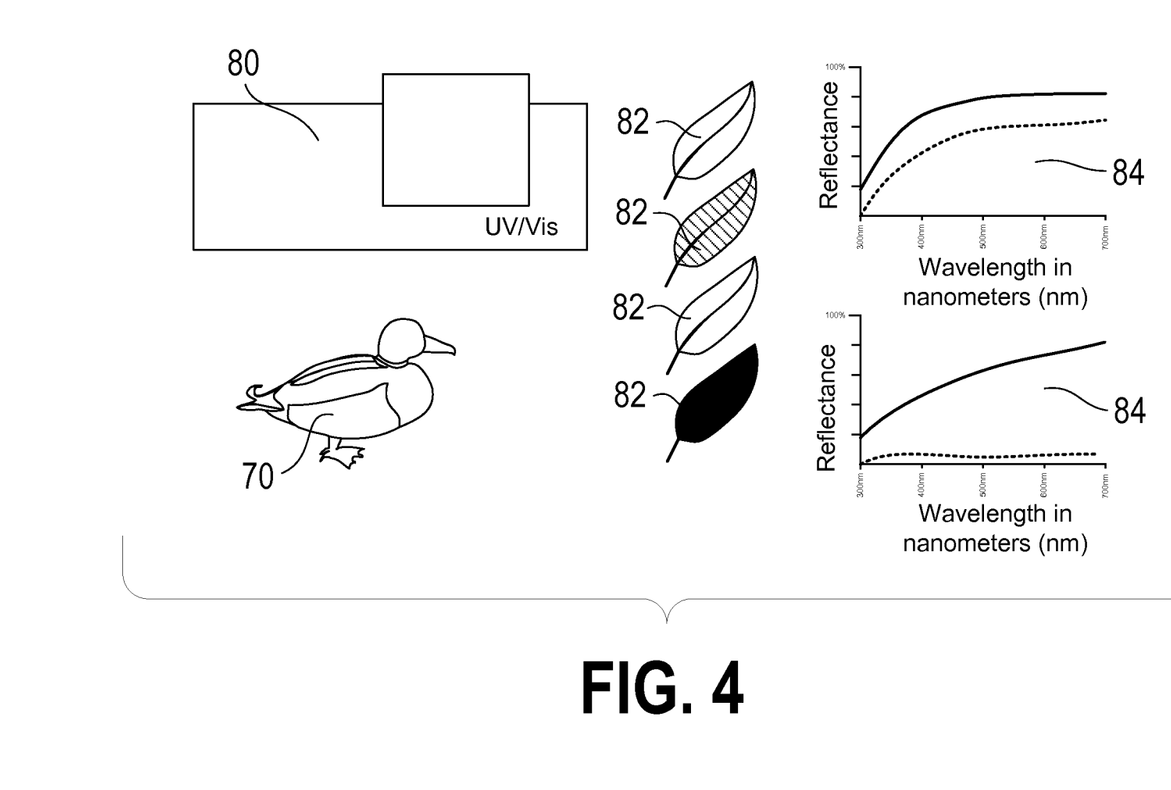
FIG. 4 illustrates a laboratory set up using a UV-Vis spectrophotometer to determine the quantitative reflectance curve across the spectrum of the animal vision system.

The present invention describes a method of mapping the reflectance characteristics of the outer surface of an animal. Refer now to FIG. 3 and FIG. 4. FIG. 3 illustrates a test set-up which uses UV imaging or similar techniques to determine areas of low, medium, and high reflectance on the outer surface of the animal. The animal subject 70 is placed in front of a UV imaging camera 74. Light sources 72 emit ultraviolet light onto the animal subject 70, and the reflected UV light is detected by the UV imaging camera 74. A monochrome image 78, showing areas of high UV reflectance as bright areas, moderate UV reflectance as shades of gray and no UV reflectance as dark areas, is displayed on a computer display 76. The data from the image 78 is interpreted and recorded to show a map of the UV reflection pattern like that shown in FIG. 1.

FIG. 4 illustrates an additional step in which the animal subject 70 is mapped with a UV-Vis spectrophotometer 80 to determine the quantitative reflectance curves 84 across the spectrum of the animal vision system. Surface measurements are taken from whole or partial samples 82 from carcasses or other natural samples. A reflectance curve 84 is generated in this manner for each different sample 82. Example reflectance curves 84 can be seen in greater detail for the animal components 50, 52, 54 and 97 on FIG. 2.

Figure 5:
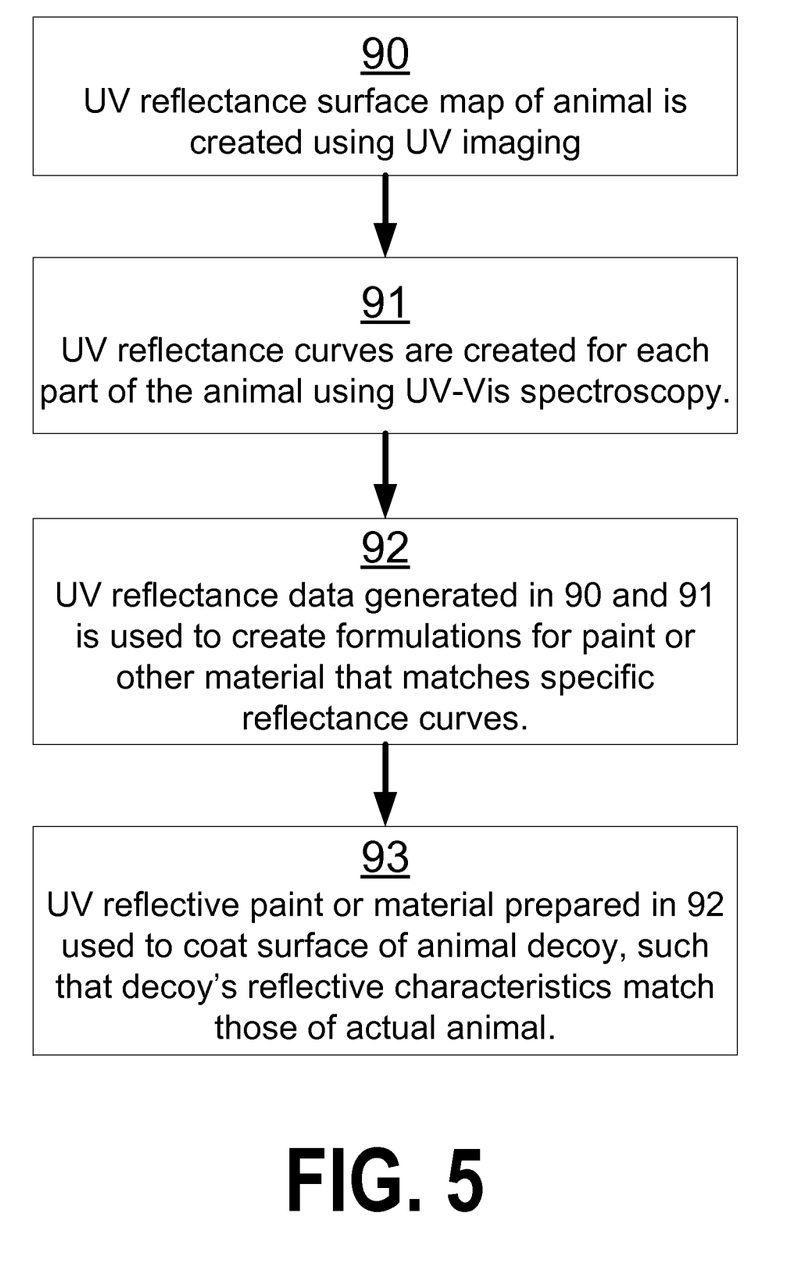
FIG. 5 is a flowchart of the process of creating animal decoys exhibiting realistic UV reflections.

FIG. 5 is a flowchart of the process of creating animal decoys exhibiting realistic UV reflections. In Step 90, a UV reflectance surface map is created for the animal subject 70. This is done by the UV imaging process previously described herein in FIG. 3. In Step 91, UV reflectance curves 84 are created for various samples 82 of an animal carcass. This is done by the UV-Vis process previously described herein in FIG. 4. The UV image 78 and reflectance curves 84 are analyzed to create specific formulations of paint or other surface covering material, as shown in Step 92. In Step 93, the UV-reflective paint or material is applied to the outer surface of an animal decoy, or the decoy itself is composed of said materials, to create a model of the animal subject 70 that appears visually realistic to the animal in the animal's visual spectrum.

Figure 6:
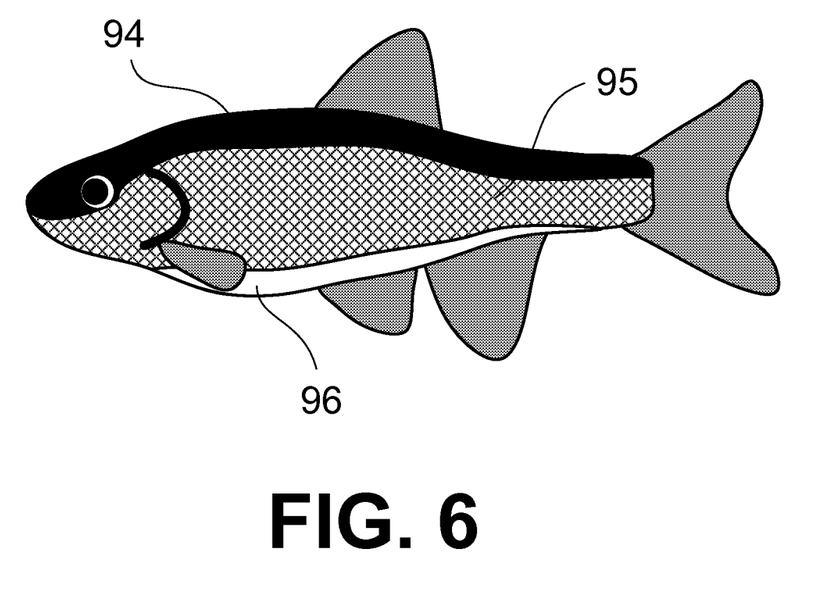
FIG. 6 shows a common ultraviolet reflectivity pattern of an example minnow bait fish.

FIG. 6 illustrates the UV general reflectance patterns of common bait fish minnows such as flathead, shiners, suckers and many other common bait fish. The dark top 94 is typically brown, tan, and black patterns and contains a low level of UV reflection, typically less than 20%. The silvery sides 95 possess bright specular UV reflectance, as much as 80% or higher at certain angles. The belly 96 possess bright diffuse UV reflectance from 15-80%. Current lures attempt to achieve this diffuse reflectance with conventional paints and as such are UV-absorbing, typically about 90% UV absorbing (or more) or only 10% reflecting (or less) in the UV wavelengths. The present invention matches the diffuse UV reflection of animals such as bait fish which is typically 15% to 80% UV in the areas described in FIG. 6.

While it is apparent that some of the current art inadvertently often achieves some specular (non-diffuse) UV reflection of the sides 95 of a bait fish with the use of embossed or otherwise textured metal foils, it is also apparent the diffusely reflecting surface is achieved with paint, coatings, printing inks, or molded-in colored surfaces which are typically plastic, and as such will be UV-absorbing as said surfaces employ TiO2 to achieve diffuse reflectance of white and light colors.

In the preferred embodiment, one or more surfaces of a decoy or decoy lure are coated or coloration is molded-in to achieve diffuse UV reflection on those surfaces where diffuse UV reflection is present in the animal to be mimicked. This diffuse reflection is typically between 15 to 80% UV reflecting in the wavelengths from 320 nm to 400 nm with the preferred embodiment being 30% to 70% for human-visible white (and other light colors and some bright colors) but could be as low as 12% and as high as 90%.

In another embodiment, the underside or belly areas of a decoy lure are painted with diffusely reflecting UV paint which is human-visible white, or light-colored, or brightcolored but it will become apparent that this pattern of UV reflection applies to certain bait fish, and other animals to be mimicked by decoys or decoy lures could have different diffusely UV-reflective areas.

The methods used to measure this UV reflectance and subsequently to develop coatings or molded-in colors are established in U.S. patent application Ser. Nos. 11/711,409 and 11/711,410, to which this application is a continuation in part. The ability to discriminate and measure diffuse versus specular reflectance is a common attribute of UV/Vis spectrophotometers and understood by those skilled in the art.

Having described the preferred embodiment and other example embodiments, it will become apparent that various modifications can be made without departing from the scope of the invention as defined in the accompanying claims. In particular, any animal, plant, seeds, or even an object, can be used as a decoy or decoy lure if it aids in the deception of an animal. The common waterfowl and bait fish minnow discussed directly herein are intended as examples only and the teachings of this application could be applied to any object intended to deceive or lure an animal. In addition, methods of measuring the UV reflectance of an animal or object other than those discussed herein may be used to achieve the same or similar results. Using the methods described, it will also become apparent that certain animals may have cryptic UV reflecting surfaces that do not correspond to bright human visible colors. It is obvious that many animals vary in humanvisible appearance between male and female; using the methods described, it will become apparent that game animals and bait fish may possess human-invisible appearance differences that could be mimicked to make decoys or decoy lures more effective.

What is claimed:

1. A method of creating a surface coating for use on a model of an animal, comprising the steps of using a spectroscopic imaging means to measure a percent light reflectance value reflected from a feature on the animal for each of a plurality of wavelengths of light, wherein said plurality of wavelengths of light includes one or more wavelengths which are visually detectable to the animal but not visually detectable to a human;

using the measured percent light reflectance values to define a first spectral reflectance curve for the feature on the animal; and formulating a surface coating for use on the model of an animal, such that the surface coating has a second spectral reflectance curve which substantially matches the first spectral reflectance curve across any wavelengths which are visually detectable to the animal, wherein the surface coating consists of a synthetic material, and wherein the surface coating does not comprise any portion of an animal.

2. The method of creating a surface coating of claim 1, wherein the step of formulating a surface coating further comprises formulating the surface coating to reflect at least 15% of all ultraviolet wavelengths between 320 nanometers and 400 nanometers that fall incident on the coating.

3. The method of creating a surface coating of claim 1, wherein the surface coating is a paint comprising at least one pigment and at least one binder.

4. The method of creating a surface coating of claim 1, wherein the surface coating is a molded plastic comprising at least one pigment and at least one binder.

5. The method of creating a surface coating of claim 1, wherein the feature on the animal comprises white colored feathers on a game bird, and wherein the surface coating has an average reflectance greater than 35 percent and less than 70 percent for all wavelengths between 320 and 400 nanometers, inclusive.

6. The method of creating a surface coating of claim 1, wherein the feature on the animal comprises light colored feathers on a game bird, and wherein the surface coating has an average reflectance greater than 18 percent and less than 53 percent for all wavelengths between 320 and 400 nanometers, inclusive.

7. The method of creating a surface coating of claim 1, wherein the animal is selected from the group consisting of game bird, waterfowl, turkey, deer, antelope, coyote, and rabbit.

8. The method of creating a surface coating of claim 1, wherein the animal is selected from the group consisting of fish, game fish, bait fish, bait animal, and marine animal.

* * * * *